Oct. 20, 1931.  H. D. GEYER  1,828,403
STEERING WHEEL AND HORN BUTTON MOUNTED THEREIN
Filed Nov. 16, 1928  3 Sheets-Sheet 1

Inventor
Harvey D. Geyer
By Spencer Hardman & Fehr
his Attorneys

Inventor
Harvey D. Geyer
By Spencer Hardman & Fehr
his Attorneys

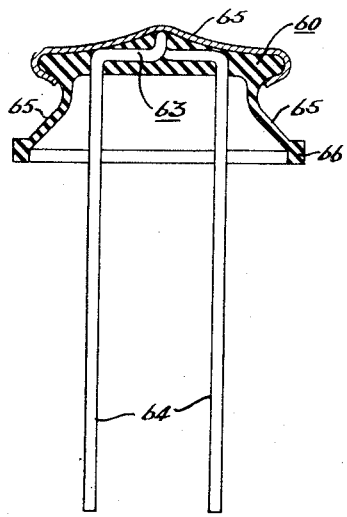
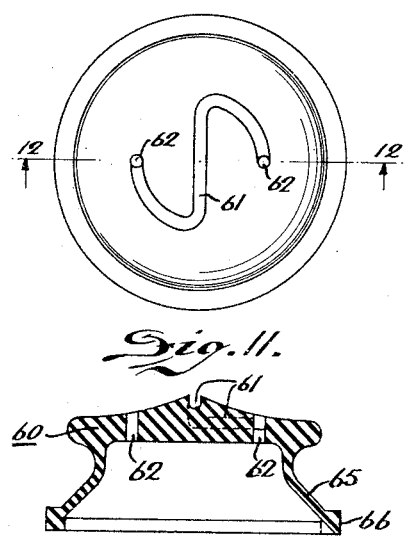
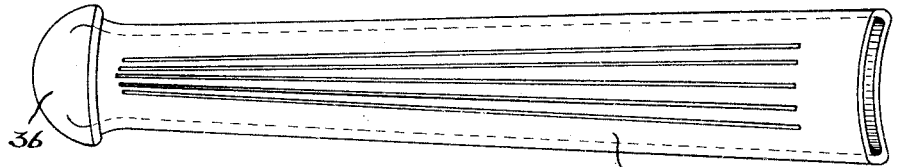
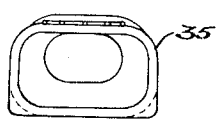

Patented Oct. 20, 1931

1,828,403

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL AND HORN BUTTON MOUNTED THEREIN

Application filed November 16, 1928. Serial No. 319,981.

This invention relates to handwheels, particularly such as are adapted for use as steering wheels on automotive vehicles.

An object of this invention is to provide a strong and efficient handwheel of improved appearance and having rubber covered metal spokes. An important feature of the invention resides in forming the vulcanized rubber boots for the spokes separately and later telescoping said boots upon the spokes instead of vulcanizing the rubber directly upon the spokes as has been done heretofore. This feature results in great economies of manufacture due to the less cost of manufacturing the boots separately and since the rim can be of wood and completely finished prior to assembling the spider to the rim. The separate rubber boots can have their outer ends turned back sufficiently to permit the proper insertion of the wood screws which secure the spider to the rim after which the boots are fixed in normal position where they completely conceal these screws and the joint between the metal spoke and rim.

Another object is to provide a very simple and efficient flexible rubber horn button mounted in and substantially filling a central open top recess in the hub portion of the wheel. A feature of this horn button is its means of attachment whereby it may be easily inserted in place or removed by distortion of the rubber after the nut which retains the wheel on the shaft is screwed home. Another feature of the horn button is the molded pyralin, celluloid, or similar cover which is snapped thereupon to greatly improve the appearance thereof and to hold the metal hair-pin substantially rigid therewith and provide for an easy depression of the cap portion of the horn button.

Another feature of the invention is the utilization of the annular metal casing enclosing the anti-rattle bearing for the steering shaft as the stationary contact ring for the horn circuit switch. Such anti-rattle bearings with metal casings have heretofore been in common use together with an entirely separate insulated stationary contact ring for cooperation with a depressible horn button contact member. By this invention the metal casing of the bearing is insulated from the mast jacket and so rendered useable as the stationary contact ring, thus greatly simplifying the construction.

Further objects and advantages of the present invention will be apparent from the following description, reference being had to the accompanying drawings, wherein a preferred embodiment of one form of the present invention is clearly shown.

Figure 1:
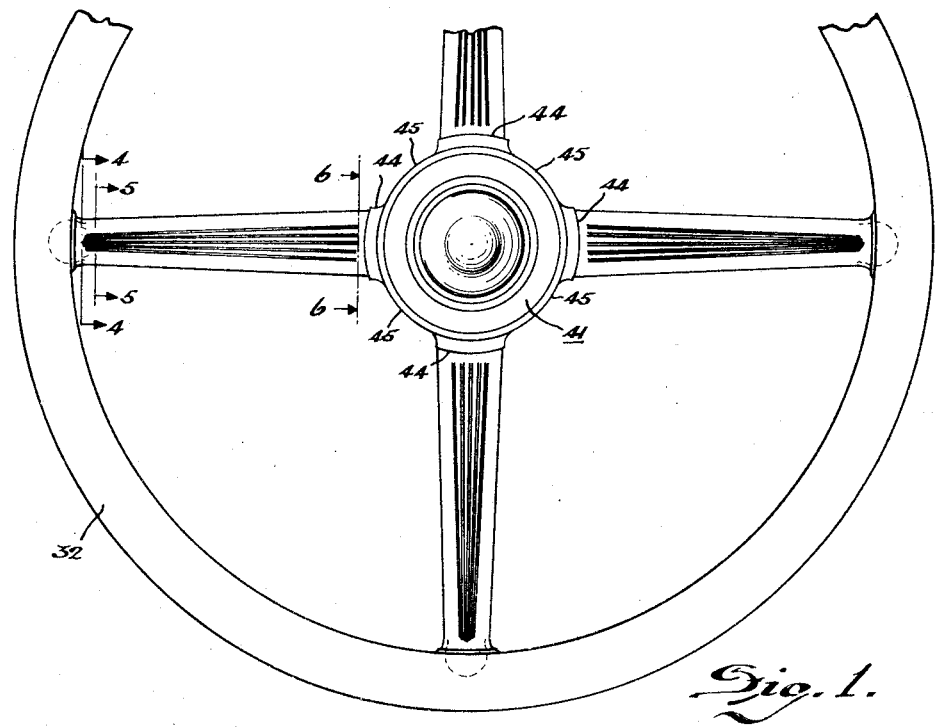
Fig. 1 is a partial plan view of an automobile steering wheel made according to this invention.
Figures 2, 3, 5, 6:
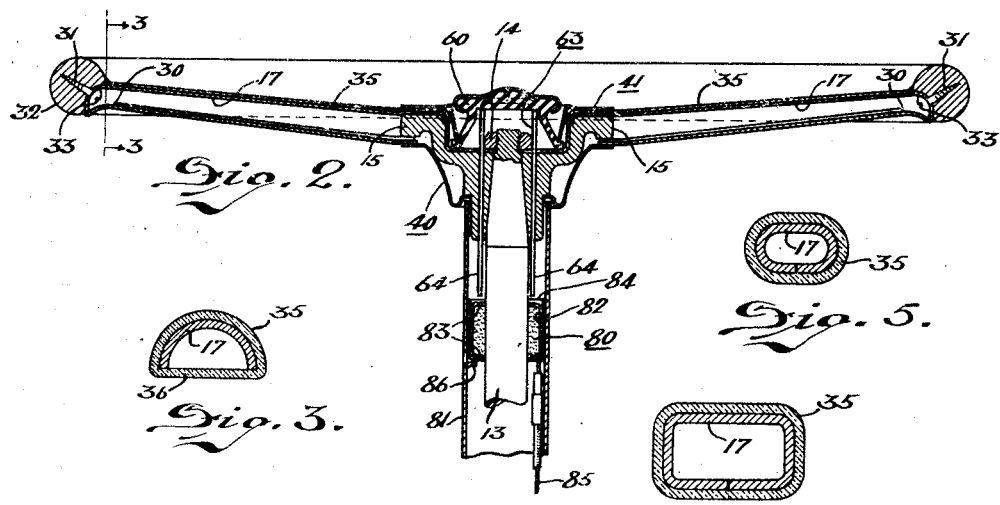
Fig. 2 is a vertical section through the wheel mounted upon its shaft and shows the complete horn switch mechanism.
Fig. 3 is a cross section through the outer end of the spoke on line 3—3 of Fig. 2.
Figure 4:

Figs. 4 and 5 are similar sections taken on lines 4—4 and 5—5 of Fig. 1.

Fig. 6 is a section taken on line 6—6 of Fig. 1.

Figure 7:
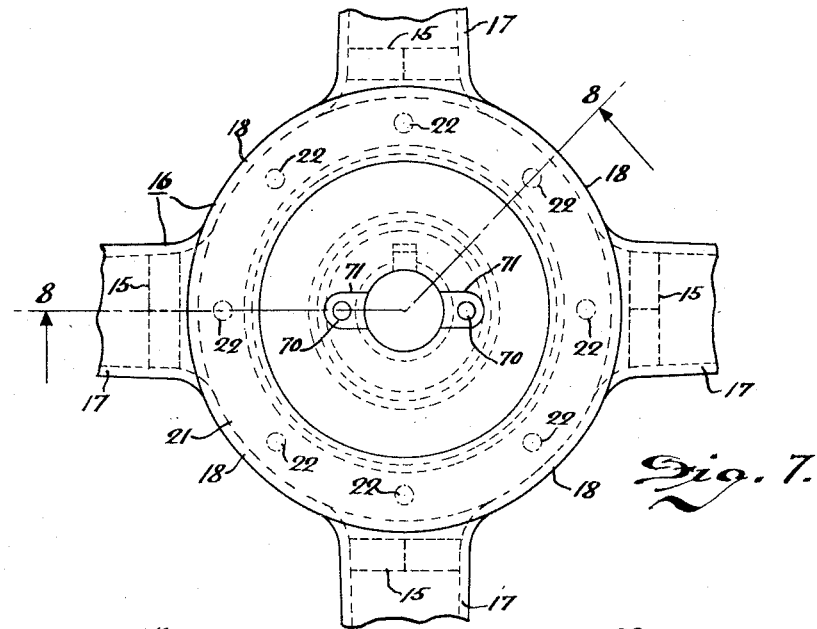

Fig. 7 is a detail view showing a plan of the central portion of the main structure of the wheel.

Figure 8:
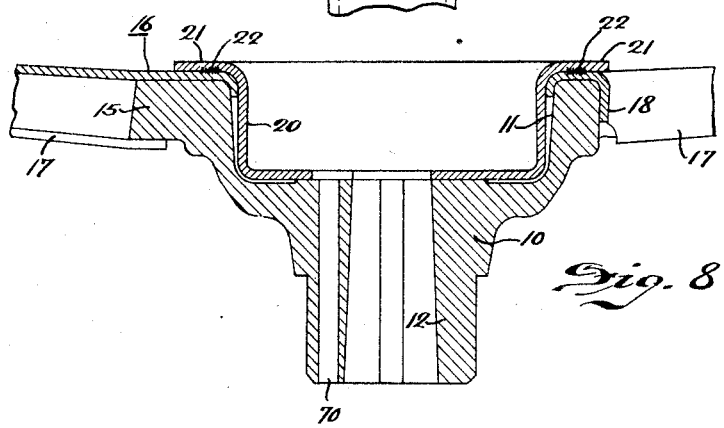

Fig. 8 is a section on line 8—8 of Fig. 7.

Figure 9:
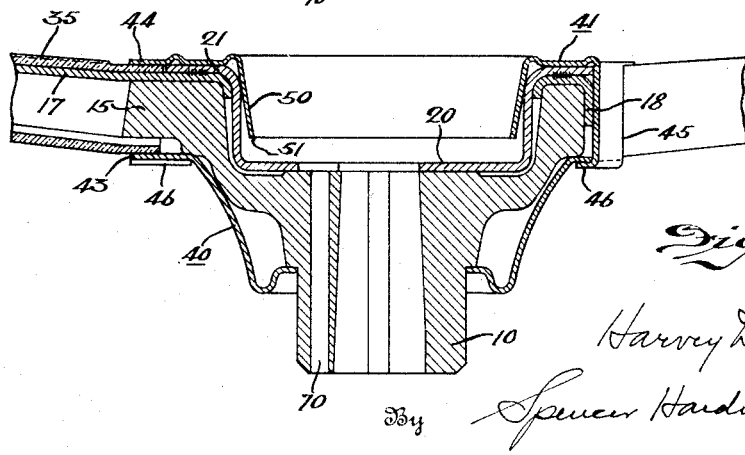

Fig. 9 is section similar to Fig. 8 but shows the rubber boots and the top and bottom cover plates assembled in place.

Fig. 10 is a sectional detail of the horn button with the hair pin fixed thereto.

Fig. 11 is a plan of the soft rubber portion of the horn button.

Fig. 12 is a section on line 12—12 of Fig. 11.

Fig. 13 is a top view of one of the soft rubber boots.

Fig. 14 is a side elevation of Fig. 13.

Fig. 15 is an end view taken in direction of arrow 15 of Fig. 14.

Fig. 16 is an end view taken in direction of arrow 16 of Fig. 14.

Figs. 17 and 18 are cross sections taken on lines 17—17 and 18—18 of Fig. 14.

Similar reference characters refer to similar parts throughout the several views.

Numeral 10 designates the hub casting which has an open top central recess 11 and a central bore 12 adapted to fit upon the upper tapered end of the steering shaft 13 (see Fig. 2). Hub 10 has four radial projections 15 which serve as stub arms for the spider spokes. The spider proper, indicated in its entirety by 16, is preferably formed from a single piece of sheet metal and pressed to the shape shown. Each of the pressed metal spokes 17 is formed to box section and the inner ends of these box sections are folded tightly about the hub projections 15 (as clearly shown in Figs. 7, 8, 9) while the flange portions 18 are turned down and ironed up tightly against the curved vertical edges of hub 10. It is thus seen that the pressed metal spider 16 is fastened to the hub 10 by a method approximating that disclosed in Patent No. 1,638,044 to J. W. Lee of Aug. 9, 1927. However in the present case the recess 11 in hub 10 is of such substantial depth that the metal of spider 16 can not be drawn sufficiently to form the cup 20 integral with the spider stamping 16, and therefore cup 20 is made as a separate piece (preferably as a pressed sheet metal part) and provided with a marginal flange 21 which overlies and is preferably welded to the adjacent metal of stamping 16. In Figs. 7 and 8 flange 21 is shown welded to the spider stamping 16 at the points 22 whereby the cup 20 is in effect made integral with the stamping 16. Cup 20 fits snugly within recess 11 and when the wheel is fixed upon the steering shaft 13 and nut 23 screwed home (see Fig. 2) the cup 20 is clamped firmly in place by this nut 23 which therefore aids in holding the spider 16 firmly fixed to the hub 10.

The box section spokes 17 are shaped at their outer ends as shown in Figs. 2, 3, and 4. The under side of the spoke is cut away from the point 30 (see Fig. 2) to permit the wood screws 31 to be properly inserted angularly from below and driven home into rim 32 with a screw-driver. The top side of the box section spokes 17 is curved downwardly at their outer ends at 33 as clearly shown in Fig. 2 to provide an end flange through which the screw 31 passes.

Prior to assembling the spider upon the rim, each of the spokes 17 has a molded flexible rubber boot 35 telescoped thereupon. These boots 35 are molded to the shape clearly shown in Figs. 13 to 18 inclusive and snugly fit the box section metal spokes 17 when slipped thereupon. The outer ends of the flexible boots 35 are turned back to permit the proper insertion of screws 31 after which they are returned to normal position when they fit neatly up against the rim 32 and completely conceal the metal spokes 17. The outwardly projecting lip 36 completely covers up the opening formed for the insertion of screws 31 and provides a smooth under surface at the outer end of the spoke and so provides a smooth hand grip at all points (see Figs. 3 and 4). The rubber boots 35 at their inner ends overlap the hub projections 15 a short distance and at the top side fall substantially flush with the flange 21 of cup 20 (see Figs. 2 and 9).

A bottom cover plate 40 (preferably pressed to shape from light aluminum alloy) is fitted over the lower exposed portion of hub casting 10, while a similar top cover plate 41 is fitted over the top portion thereof. These cover plates 40 and 41 completely enclose the exposed portions of hub casting 10 and the pressed metal cup 20 and are provided with radial projections 43 and 44 respectively which surround and overlap the inner ends of the rubber boots 35, as clearly shown in Figs. 1, 2, and 9. The top cover plate 41 has depending projections 45 extending down between each pair of spokes and crimped over at 46 on the under side of the peripheral margin of the lower cover plate 40, thus retaining both cover plates rigidly fixed upon the central portion of the wheel.

The top cover plate 41 has a central aperture and a depending annular flange 50 which fits within the central cup 20 as clearly shown in Fig. 9. The lower edge of flange 50 is spaced slightly from the circular wall of cup 20 and also from the bottom of said cup thereby forming a shoulder 51 which serves to retain the flexible rubber horn button 60 in place (see Fig. 2). Horn button 60 is molded from soft elastic rubber to the shape clearly shown in Figs. 10 to 12. The S-shaped groove 61 and two holes 62 are molded therein to receive the correspondingly shaped metal hair pin 63 which may be inserted into the rubber button 60 from above so that the legs 64 of the hair pin project downwardly through holes 62 and so that the S-shaped upper end thereof is embedded in the rubber below or at least flush with the top surface of the rubber button (see Fig. 10). After hair pin 63 is thus inserted a molded cap 65 of pyralin, celluloid, or similar substance is snapped into place covering the top of the soft rubber button 60 and also retaining hair pin 63 against removal as is obvious from Fig. 10. Cap 65 is preferably of black pyralin and may be highly polished so that the appearance of the horn button is greatly improved over that of a soft rubber button which will not take a polish. Cap 65 also stiffens the entire upper portion of the soft rubber button 60 so that upon depression of the button by the operator the flexure of the rubber will occur entirely in the flared cup portion 65 thereof which is entirely concealed from view. The horn button assembly shown in Fig. 10 may be easily inserted within the central cup 20 of the wheel after the wheel is fixed upon the steering shaft 13 by screwing the nut 14 down tight upon the bottom of cup 20. Two diametrically opposed holes 70 are provided in hub 10 through which the legs 64 of hair pin 60 may reciprocate freely. The bottom of cup 20 is cut away at 71 to expose holes 70 (see Fig. 7). In assembling the horn button assembly in place, the legs 64 are inserted in holes 70 and the flared portion of the soft rubber button 60 pressed down within the tapered flange 50 until its bottom flange 66 snaps in place under the shoulder 51 in the position clearly shown in Fig. 2. The engagement of flange 66 under shoulder 51 retains the horn button in place, but in case it is desired to remove the steering wheel from its shaft the button may be pulled up with only slight difficulty due to the distortability of flange 66 and access to the holding down nut 14 thereby obtained.

In Fig. 2 there is shown an anti-rattle bearing 80 which supports the shaft 13 centrally within the mast jacket 81. Bearing 80 comprises a pressed metal casing 82 having inturned flanges 83 at each end thereof which clear shaft 13 by a small distance. Metal casing 82 is packed tightly with a suitable nonmetallic material, such as corded fiber, which serves as a non-metallic bearing for shaft 13 and prevents any looseness or rattling of the shaft or of the hub 10 within the tubular jacket 81. Metal casing 82 is electrically insulated from the tubular jacket 81 by an insulating sleeve 84 (such as bakelite) which has an in-turned flange under the metal casing 82. The insulated horn circuit wire 85 extends up inside the tubular jacket 81 from the lower end thereof and is connected to the metal casing 82 by any suitable means, preferably by a single turn of heavy wire resting directly upon the lower inturned flange 83 of metal casing 82, whereby wire 85 is electrically connected to and supported by metal casing 82 but is insulated from the outside mast jacket 81. In assembling bearing 80 in the position shown in Fig. 2, the upper end of wire 85 is first connected to metal casing 82, as above described, and the depending wire 85 inserted between shaft 13 and jacket 81 at the open top thereof (the steering wheel of course being not yet assembled upon shaft 13). Then metal casing 82 is inserted within the insulating sleeve 84 and this unit is inserted over the tapered end of shaft 13 and pressed down thereupon, the sleeve 84 having a snug fit within the stationary mast jacket 81. A suitable lug 86 fixed to jacket 81 is provided to limit the downward movement of bearing 80. Bearing 80 is prevented from turning with the shaft 13 by its tight fit within jacket 81. The steering wheel without the horn button 60 and its attached hairpin is next assembled upon shaft 13 by a suitable key or spline and by nut 14 which may be easily screwed down tight by a socket wrench. The horn button 60 and its attached hair-pin is then assembled in the manner described hereinabove.

The depression of the horn button by the operator forces legs 64 of the hair-pin into contact with the upper flange 83 for the insulated metal casing 82, thereby completing the horn circuit by grounding wire 85 through hair-pin legs 64 to hub 10 to shaft 13 to the automobile framework. The resiliency of the flared portion 65 of the soft rubber horn button returns the hairpin to its normal raised position (see Fig. 2) and hence no additional return spring is required.

While the form of embodiment of the present invention as herein disclosed constitutes a preferred form, it is to be understood that other forms might be adopted, all coming within the scope of the claims which follow.

What is claimed is as follows:

1. A handwheel comprising: a hub having a central bore for fixing to a shaft and having a central recess of substantial depth at its top adapted to receive actuating mechanism, a pressed sheet metal spider overlying and fixed to said hub and having a central hole registering with said central recess, and a drawn metal cup fitting within said recess and having a marginal flange overlying said pressed metal spider and adapted to be clamped down upon said hub by a nut threaded to the shaft.

2. A handwheel comprising: a hub having a central bore for fixing to a shaft and having a central recess of substantial depth at its top adapted to receive actuating mechanism, a pressed sheet metal spider overlying and fixed to said hub and having a central hole registering with said central recess, and a drawn metal cup fitting within said recess and welded to said pressed metal spider around the margin of said central recess.

3. In combination, a rotatable shaft, a handwheel having a top central cup-shaped recess and a central bore fitting over the shaft end, a nut threaded upon the shaft end and located in the bottom of said recess for clamping said wheel upon said shaft, a flexible rubber horn button of inverted cup shape insertable within said central recess only by distortion of the flexible rubber after said nut is screwed home, and a peripheral shoulder within said recess for retaining said horn button in place.

4. In combination, a rotatable shaft, a handwheel having a top central cup-shaped recess and a central bore fitting over the shaft end, a nut threaded upon the shaft end and located in the bottom of said recess for clamping said wheel upon said shaft, a flexible rubber horn button of inverted cup shape insertable within said central recess after said nut is screwed home, and a downwardly faced peripheral shoulder within said recess for retaining said cup in place but permitting its removal by distortion of the flexible rubber, whereby access to said nut is obtained for removal of the wheel from its shaft.

5. In combination, a rotatable shaft, a handwheel having a top central cup-shaped recess and a central bore fitting over the shaft end, a nut threaded upon the shaft end and located in the bottom of said recess for clamping said wheel upon said shaft, means within said recess forming a peripheral shoulder near the bottom thereof, a flexible rubber horn button of inverted cup shape insertable within said recess after said nut is screwed home and having an outwardly projecting flange thereon adapted to snap outwardly under said shoulder whereby said horn button is removably retained in place.

In testimony whereof I hereto affix my signature.

HARVEY D. GEYER.